No. 872,182. PATENTED NOV. 26, 1907.
R. H. JAHNS.
CORD KNOTTER.
APPLICATION FILED APR. 24, 1906.
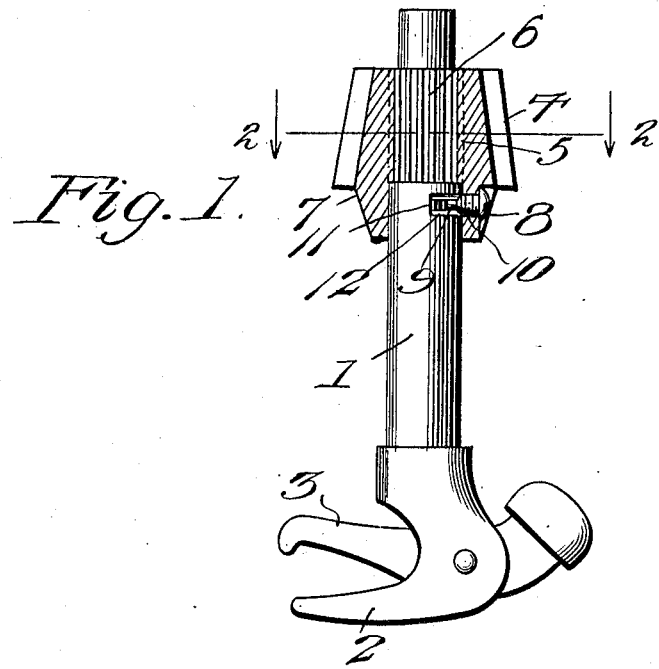
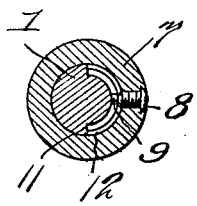
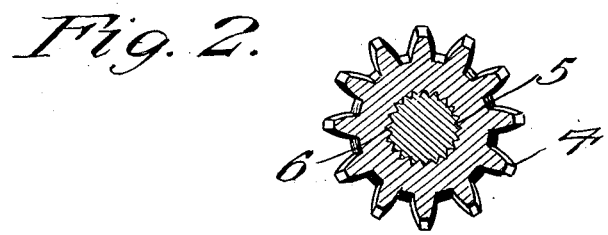

UNITED STATES PATENT OFFICE.

ROBERT H. JAHNS, OF NACO, ARIZONA TERRITORY.

CORD-KNOTTER.

No. 872,182.  Specification of Letters Patent.  Patented Nov. 26, 1907.

Application filed April 24, 1906. Serial No. 313,404.

*To all whom it may concern:*

Be it known that I, ROBERT H. JAHNS, a citizen of the United States, residing at Naco, in the county of Cochise and Territory of Arizona, have invented new and useful Improvements in Cord-Knotters, of which the following is a specification.

This invention relates to cord knotters, the object of the invention being to provide a cord or twine knotter for harvesting machines, in which provision is made for adjusting the knotter shaft relatively to and within the knotter pinion for the purpose of enabling the knotter hook to be adjusted to the proper position upon and relatively to the knotter shaft for effecting a correct tying of the knots by bringing the knotter hook into operation at exactly the proper moment.

With the above and other objects in view, the invention consists in the novel construction, combination and arrangement of parts hereinafter more fully illustrated, described and claimed.

In the accompanying drawings, Figure 1 is a sectional elevation of a cord knotter, showing the knotter shaft in elevation and the knotter pinion in section. Fig. 2 is a cross-section through the pinion and shaft on the line 2—2, of Fig. 1, showing the interlocked engagement between the knotter shaft and knotter pinion. Fig. 3 is a section on the line 3—3, Fig. 1.

Referring to the drawings, 1 designates the knotter shaft provided with the usual stationary jaw or hook 2 and the movable jaw or knotter hook 3; said parts being of the usual construction and arrangement.

Mounted on the knotter shaft 1 is the knotter pinion 4 which, in the main, is of the ordinary construction but which, in carrying out the present invention, is provided within its bore, with a multiplicity of teeth 5 extending lengthwise of the bore thereof and parallel to each other, said teeth being adapted to engage and fit between corresponding teeth 6 on the knotter shaft, as shown in Fig. 1, whereby relative movement between the knotter shaft and pinion is prevented, the engagement, however, permitting the pinion to be moved lengthwise of the shaft in order to remove the pinion therefrom. The pinion is also provided with a hub portion 7 having a threaded opening in which is fitted a set screw 8, the inner end of which is reduced, as shown at 9, to provide a conical wedging shoulder 10. The shaft 1 is also provided with a groove 11 extending part way around the same and having a parallel sided inner portion which receives the reduced extremity of the set screw and oppositely disposed beveled walls 12 against which the conical shoulder of the set screw bears for the purpose of properly positioning the pinion on the shaft.

In order to change the relation between the pinion and its shaft, the set screw 8 is removed or partially withdrawn and the pinion is then slid out of engagement with the teeth 6 of the shaft, being again re-set thereon in like manner after partially rotating the pinion in order to bring the desired teeth of the pinion and shaft into register and interlocked engagement with each other. When the pinion is properly set in the manner described, the screw 8 is forced inward, whereupon the inclined shoulders of the screw and the beveled walls of the groove in the shaft coöperate to crowd the pinion one way or the other lengthwise of the shaft 1 until it is restored to the exact position on said shaft. The teeth 5 and 6 prevent any possibility of relative rotative movement between the pinion and shaft, while the set screw 8 insures the proper positioning of the pinion on the shaft and prevents any movement of said pinion lengthwise of the shaft.

I claim:

The herein described cord knotter comprising a knotter shaft having an annular series of teeth extending lengthwise thereof, and said shaft provided with a segmental groove extending partially around the same at a point beyond the teeth, said groove having oppositely disposed beveled side walls, a beveled knotter pinion having a bore provided with interior teeth extending lengthwise thereof to engage the teeth on the knotter shaft to prevent relative rotary movement, while permitting relative sliding movement, and a set screw carried by the knotter pinion and having its inner end reduced to form a beveled shoulder which coöperates with the beveled walls of the groove in the knotter shaft.

In testimony whereof, I affix my signature in presence of two witnesses.

ROBERT H. JAHNS.

Witnesses:
 H. G. MAULDIN,
 W. S. RENFRO.